US011898291B2

(12) United States Patent
Didat et al.

(10) Patent No.: US 11,898,291 B2
(45) Date of Patent: Feb. 13, 2024

(54) APPLIANCE HAVING A USER INTERFACE WITH PROGRAMMABLE LIGHT EMITTING DIODES

(71) Applicant: Haier US Appliance Solutions, Inc., Wilmington, DE (US)

(72) Inventors: Mark Anthony Didat, Floyds Knobs, IN (US); Donald James Leisl, III, Louisville, KY (US); Richard Gary Woodham, Jr., Taylorsville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 127 days.

(21) Appl. No.: 17/496,113

(22) Filed: Oct. 7, 2021

(65) Prior Publication Data

US 2023/0114238 A1 Apr. 13, 2023

(51) Int. Cl.

| | |
|---|---|
| ***D06F 34/32*** | (2020.01) |
| ***D06F 34/14*** | (2020.01) |
| ***D06F 34/28*** | (2020.01) |
| ***H05B 47/12*** | (2020.01) |
| ***H05B 47/115*** | (2020.01) |
| *D06F 34/30* | (2020.01) |

(52) U.S. Cl.

CPC .............. *D06F 34/32* (2020.02); *D06F 34/14* (2020.02); *D06F 34/28* (2020.02); *H05B 47/115* (2020.01); *H05B 47/12* (2020.01); *D06F 34/30* (2020.02)

(58) Field of Classification Search

CPC .......... D06F 34/28; D06F 34/32; H05B 47/12

See application file for complete search history.

(56) References Cited

U.S. PATENT DOCUMENTS

| | | | | |
|---|---|---|---|---|
| 6,188,986 | B1 * | 2/2001 | Matulich | G10L 15/26 704/E15.045 |
| 10,854,050 | B2 | 12/2020 | Mixter | |
| 2017/0268924 | A1 * | 9/2017 | Shin | G01V 8/10 |
| 2018/0025725 | A1 * | 1/2018 | Qian | G10L 15/1815 704/257 |
| 2019/0371343 | A1 | 12/2019 | Tukka | |
| 2020/0326497 | A1 * | 10/2020 | Fujisaki | G02B 7/02 |
| 2020/0347536 | A1 * | 11/2020 | Gregory | D06F 39/14 |
| 2020/0348905 | A1 * | 11/2020 | Fischer | H04R 3/005 |

FOREIGN PATENT DOCUMENTS

| | | | |
|---|---|---|---|
| CN | 108717270 | A | 10/2018 |

* cited by examiner

*Primary Examiner* — Michael E Barr
*Assistant Examiner* — Kevin G Lee
(74) *Attorney, Agent, or Firm* — Dority & Manning, P.A.

(57) ABSTRACT

A home appliance including a user interface with a plurality of LEDs, the LEDs being activated and deactivated according to predetermined sequences as dictated by input signals and triggers to the user interface.

20 Claims, 4 Drawing Sheets

APPLIANCE HAVING A USER INTERFACE WITH PROGRAMMABLE LIGHT EMITTING DIODES

FIELD OF THE INVENTION

The present subject matter relates generally to home appliances, and more particularly to operations of user interface panels on home appliances.

BACKGROUND OF THE INVENTION

Household appliances, including laundry appliances, are becoming increasingly connected with the internet and each other. Many household appliances are incorporating so called smart systems or digital assistants into their user interfaces which allow for easier and more interactive operation and communication between the appliance and a user or users. For at least one example, smart speakers employing voice recognition and operation are being integrated into household appliances, allowing users to operate the appliance, request information, and/or manage day-to-day activities via voice command.

For their part, smart speakers typically utilize visual cues to notify the user of an immediate state of the speaker. For instance, the smart speaker may include one or more lights, such as LEDs, which intermittently activate to alert the user. However, the lights may be complex, including multiple colors, orientations, designs, and brightness levels, and may be positioned or located in complex ways. Moreover, current smart speakers require a dedicated microphone and lights to function properly. Accordingly, further improvements are necessary to seamlessly and easily integrate smart speaker technology including notifications into household appliances.

Accordingly, an appliance that obviates one or more of the above-mentioned drawbacks would be beneficial. Particularly, a user interface of a laundry appliance with tailored visual notifications would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a laundry appliance is provided. The laundry appliance may include a cabinet, a user interface provided on the cabinet, a microphone within the user interface, and a plurality of light emitting diodes arranged in a predetermined pattern on the user interface. The method may include receiving an input trigger via the user interface; activating the plurality of light emitting diodes according to a predetermined listening sequence in response to receiving the input trigger, each of the plurality of light emitting diodes being associated with an operational indicator; receiving an input command via the microphone in response to activating the plurality of light emitting diodes; and activating the plurality of light emitting diodes according to a predetermined recognition sequence, the predetermined recognition sequence being different from the predetermined listening sequence.

In another exemplary aspect of the present disclosure, a laundry appliance is disclosed. The laundry appliance may include a cabinet forming a receiving space; a user interface provided on the cabinet, the user interface including a plurality of light emitting diodes; a microphone provided within the user interface; and a controller operably connected with the microphone and the user interface, the controller being configured to perform a series of operations. The series of operations may include receiving an input trigger; activating the plurality of light emitting diodes according to a predetermined listening sequence in response to receiving the input trigger, each of the plurality off light emitting diodes being associated with an operational indicator on the user interface; receiving an input command via the microphone in response to activating the plurality of light emitting diodes; and activating the plurality of light emitting diodes according to a predetermined recognition sequence, the predetermined recognition sequence being different from the predetermined listening sequence.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
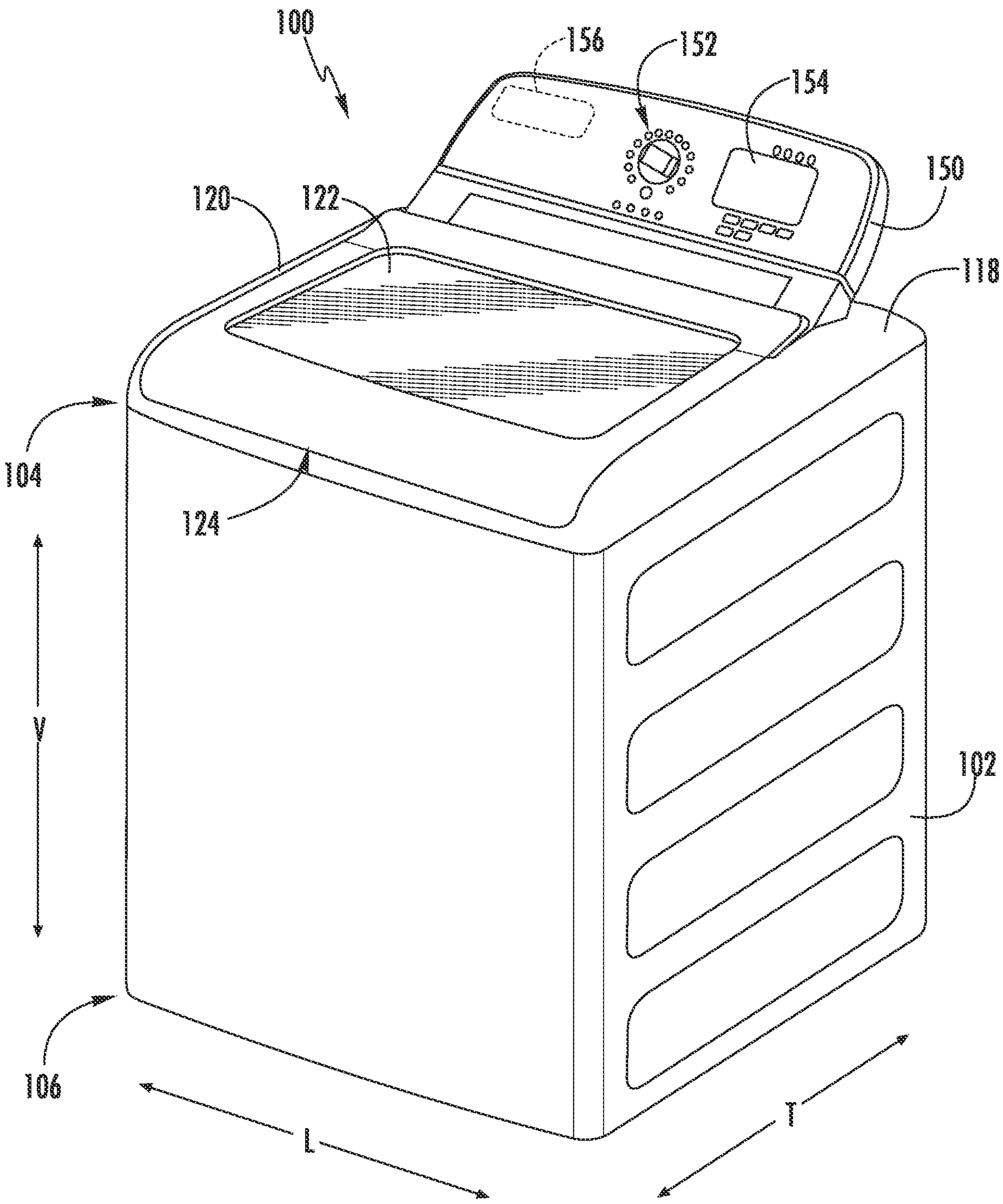
FIG. 1 provides a perspective view of a laundry appliance according to an exemplary embodiment of the present subject matter with a door of the laundry appliance shown in a closed position.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
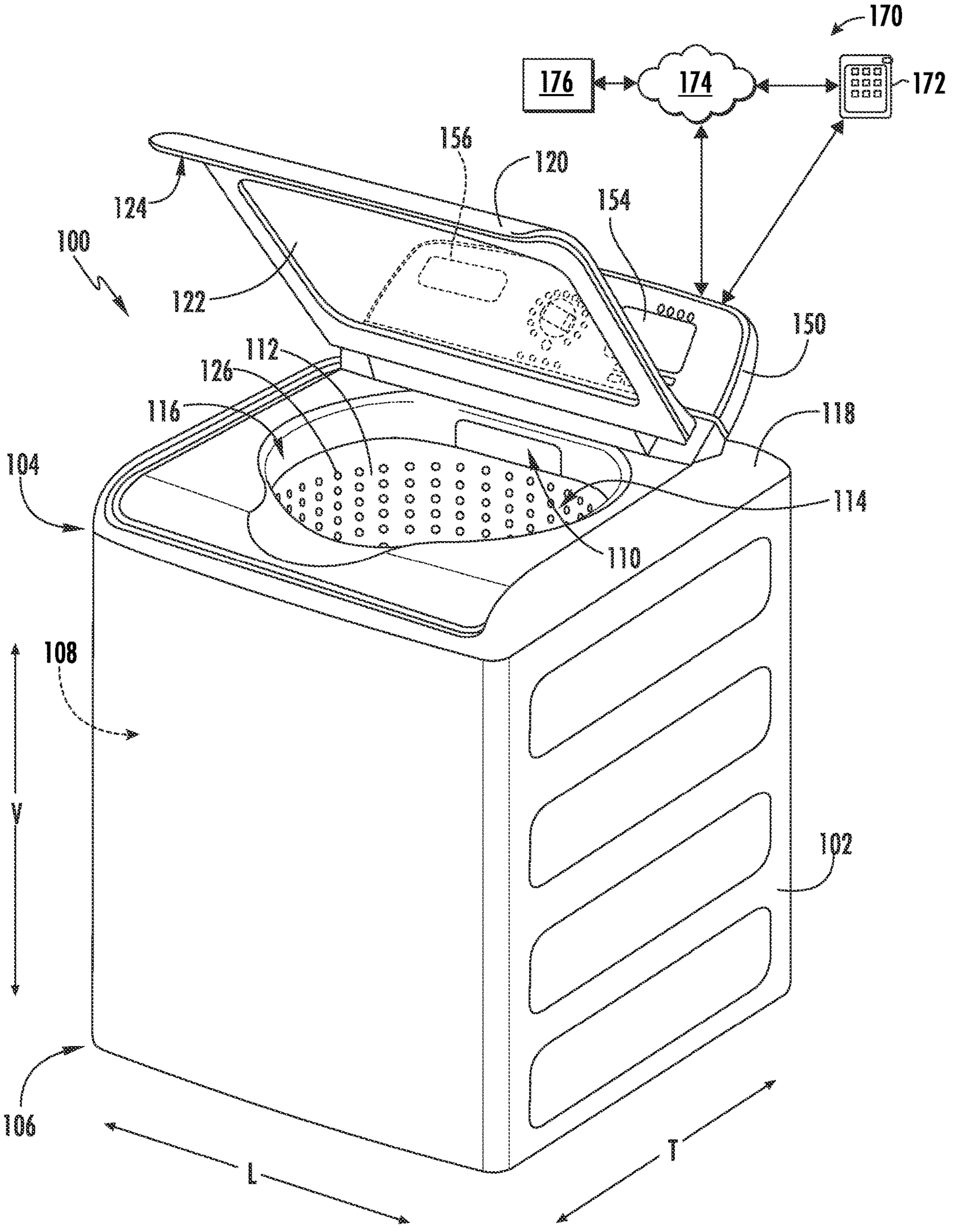
FIG. 2 provides a perspective view of the laundry appliance of FIG. 1 with the door of the exemplary laundry appliance shown in an open position.

FIGS. 1 and 2 illustrate an exemplary embodiment of a vertical axis laundry appliance or laundry treatment apparatus 100. Specifically, FIGS. 1 and 2 illustrate perspective views of laundry appliance 100 in a closed and an open position, respectively. Laundry appliance 100 generally defines a vertical direction V, a lateral direction L, and a transverse direction T, each of which is mutually perpendicular, such that an orthogonal coordinate system is generally defined.

While described in the context of a specific embodiment of a vertical axis laundry appliance, it should be appreciated that vertical axis laundry appliance 100 is provided by way of example only. It will be understood that aspects of the present subject matter may be used in any other suitable laundry appliance, such as a horizontal axis laundry appliance. Indeed, modifications and variations may be made to laundry appliance 100, including different configurations, different appearances, and/or different features while remaining within the scope of the present subject matter. Moreover, aspects of the present subject matter may be implemented using any suitable user interface of any residential or commercial appliance.

Laundry appliance 100 has a cabinet 102 that extends between a top portion 104 and a bottom portion 106 along the vertical direction V. A tub 108 may be positioned within cabinet 102 and is generally configured for retaining wash fluids during an operating cycle. Laundry appliance 100 may further include a primary dispenser 110 (FIG. 2) for dispensing wash fluid into tub 108. The term "wash fluid" refers to a liquid used for washing and/or rinsing articles during an operating cycle and may include any combination of water, detergent, fabric softener, bleach, and other wash additives or treatments.

In addition, laundry appliance 100 may include a basket 112 that is positioned within tub 108 and generally defines a chamber 114 including an opening 116 for receipt of articles for laundering. More specifically, basket 112 may be rotatably mounted within tub 108 such that it is rotatable about an axis of rotation A. According to the illustrated embodiment, the axis of rotation A is substantially parallel to the vertical direction V. In this regard, laundry appliance 100 is generally referred to as a "vertical axis" or "top load" laundry appliance 100. However, as noted above, it should be appreciated that aspects of the present subject matter may be used within the context of a horizontal axis or front load laundry appliance as well.

As illustrated, cabinet 102 of laundry appliance 100 has a top panel 118. Top panel 118 defines an opening (FIG. 2) that coincides with opening 116 of basket 112 to permit a user access to basket 112. Laundry appliance 100 further includes a door 120 which is rotatably mounted to top panel 118 to permit selective access to opening 116. In particular, door 120 selectively rotates between the closed position (as shown in FIG. 1) and the open position (as shown in FIG. 2). In the closed position, door 120 inhibits access to basket 112. Conversely, in the open position, a user can access basket 112. A window 122 in door 120 permits viewing of basket 112 when door 120 is in the closed position, e.g., during operation of laundry appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIG. 2, basket 112 further defines a plurality of perforations 126 to facilitate fluid communication between an interior of basket 112 and tub 108. In this regard, basket 112 may be spaced apart from tub 108 to define a space for wash fluid to escape chamber 114. During a spin cycle, wash fluid within articles of clothing and within chamber 114 is urged through perforations 126 wherein it may collect in a sump defined by tub 108. Laundry appliance 100 may further include a drain pump assembly that is located beneath tub 108 and basket 112 for gravity assisted flow when draining tub 108, e.g., after a wash or rinse cycle.

Referring to FIGS. 1 and 2, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation. Accordingly, control panel 150 may be referred to as a user interface hereinafter. Additionally or alternatively, input selector 152 may be referred to as a control knob.

Operation of laundry appliance 100 is controlled by a controller or processing device 156 that is communicatively coupled with control panel 150 for user manipulation to select laundry cycles and features. In response to user manipulation of control panel 150, controller 156 operates the various components of laundry appliance 100 to execute selected machine cycles and features. Controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of laundry appliance 100 may be in communication with controller 156 via one or more signal lines or shared communication busses.

It should be noted that the laundry appliance described herein is merely an example of a home appliance that may incorporate the present subject matter. For instance, the systems and methods described herein may be applied to any suitable appliance, such as a dishwasher appliance, a microwave appliance, an oven appliance, a refrigerator appliance, a kitchen hub, or the like. However, for the sake of brevity, only the laundry appliance is described herein in detail.

Referring still to FIG. 2, a schematic diagram of an external communication system 170 will be described according to an exemplary embodiment of the present subject matter. In general, external communication system 170 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 170 may be used to transfer data or other information to improve performance of one or more external devices or appliances and/or improve user interaction with such devices.

For example, external communication system 170 permits controller 156 of appliance 100 to communicate with a separate device external to appliance 100, referred to generally herein as an external device 172. As described in more detail below, these communications may be facilitated using a wired or wireless connection, such as via a network 174. In general, external device 172 may be any suitable device separate from appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control appliance 100, etc. In addition, external device 172 and remote server 176 may communicate with appliance 100 to communicate similar information.

In general, communication between appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

For instance, some appliances may include intelligent or "smart" software or other digital assistants which are capable of receiving an input (e.g., a voice input), performing a search (e.g., an internet search), and returning information to the user (e.g., as an audio output). Additionally or alternatively, the smart software may perform certain tasks when triggered by a user. The smart software may institute timers, turn on lights or air conditioning systems, or set reminders for users, for some examples. For example, the Alexa® software from Amazon® may perform such tasks, as well as Google® Home, Apple® Siri®, Samsung® Bixby®, and the like. Smart software may be installed directly into an appliance, e.g., into the memory of a controller of the appliance (e.g., controller 156). In some embodiments, the smart software is remote from the appliance (e.g., in cloud software) and the appliance communicates with the software via a remote connection (e.g., through external communication system 170).

Figure 3:
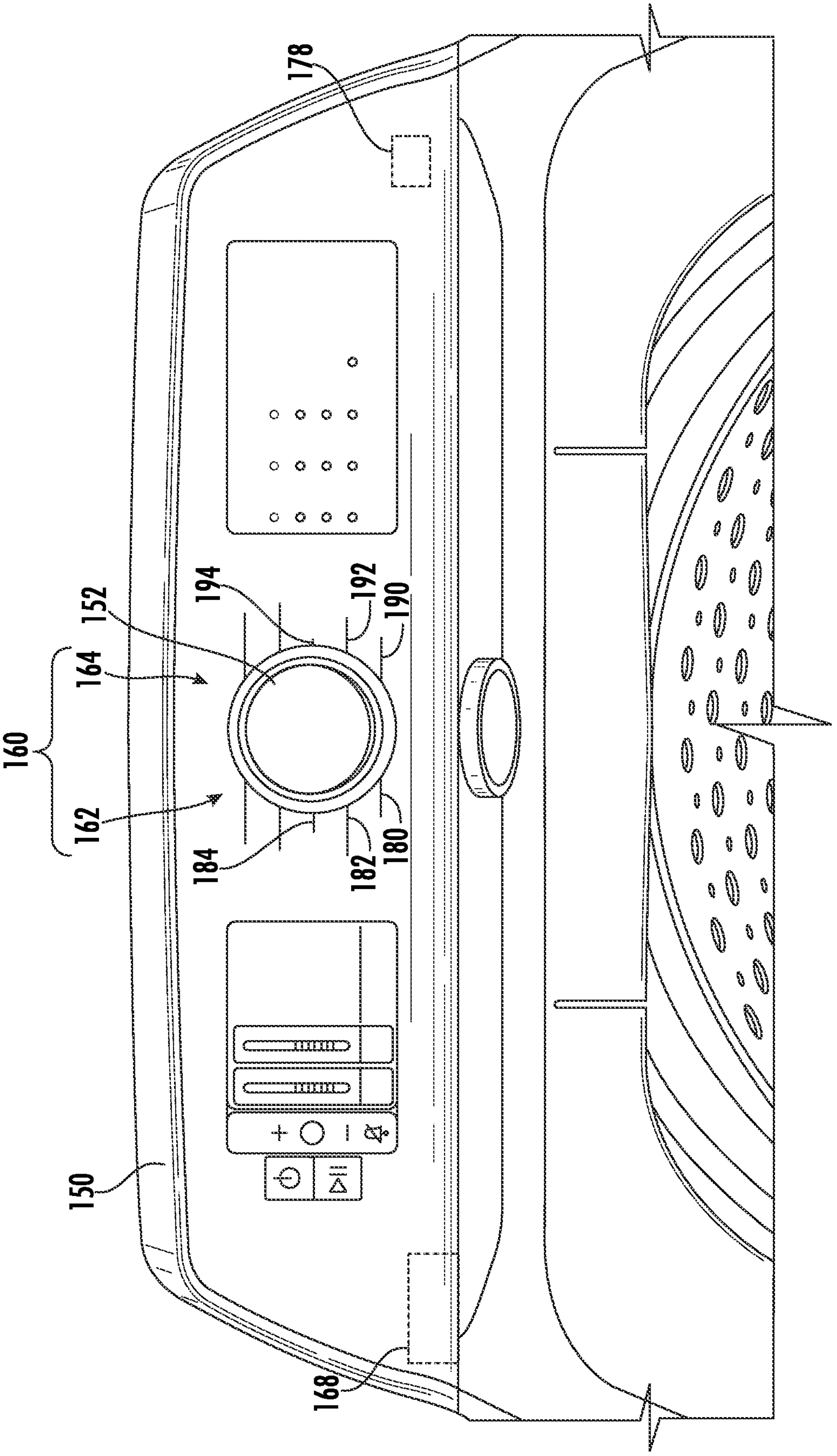
FIG. 3 provides a front perspective view of a user interface of the laundry appliance of FIG. 1.

Referring now to FIG. 3, control panel 150 will be described in detail. As described briefly above, control panel 150 (e.g., the user interface) may include input selector 152. As shown particularly in FIG. 3, input selector 152 may be a control knob. In detail, input selector 152 may be a cylindrical knob that is rotatable with respect to control panel 150. A user may rotate input selector 152 to select certain operations to be performed by the appliance. For this example, input selector 152 may select various wash, rinse, and/or spin cycles of laundry appliance 100.

Control panel 150 may include a plurality of light emitting diodes (LEDs) 160. The plurality of LEDs 160 may surround input selector 152. For instance, the plurality of LEDs 160 may be arranged circumferentially about input selector 152. Each of the plurality of LEDs may be associated with an operational indicator. Accordingly, a single LED of the plurality of LEDs may be illuminated or activated when a particular operational indicator is selected (e.g., by turning input selector 152 when input selector 152 is a control knob). Thus, a user may easily recognize which operational indicator has been selected.

The plurality of LEDs 160 may include a first array of LEDs 162. In detail, the first array 162 may be provided predominantly on a first side or first portion of input selector 152. The first array 162 may form a semi-circular arc about input selector 152. The first array 162 may include any suitable number of LEDs. For instance, as shown in FIG. 3, first array 162 may include five LEDs. Each of the LEDs in first array 162 may be even spaced out (e.g., about the circumference of input selector 152). In detail, first array 162 may include a first LED 180, a second LED 182, and a third LED 184. As mentioned above, additional LEDs may be included as well. Additionally or alternatively, each of the LEDs may be a single color LED. In at least one example, each LED may be a white LED.

The plurality of LEDs 160 may include a second array of LEDs 164. In detail, the second array 164 may be provided predominantly on a second side or second portion of input selector 152, opposite from the first side. The second array 164 may form a semi-circular arc about input selector 152. The second array 164 may include any suitable number of LEDs. For instance, as shown in FIG. 3, second array 164 may include five LEDs. Each of the LEDs in second array 164 may be even spaced out (e.g., about the circumference of input selector 152). In detail, second array 164 may include a first LED 190, a second LED 192, and a third LED 194. As mentioned above, additional LEDs may be included as well. Additionally or alternatively, each of the LEDs may be a single color LED. In at least one example, each LED may be a white LED.

Control panel 150 may include additional communicative features. For instance, control panel 150 may include a microphone 178. Microphone 178 may be configured to detect sonic signals emitted near laundry appliance 100. For instance, microphone 178 may detect audio signals, ultrasonic signals, subsonic signals, or the like. In particular, microphone 178 may detect voice inputs from a nearby user. Microphone 178 may be positioned in any suitable location within control panel 150, so as to easily detect and receive audio signals such as voice inputs. In some embodiments, microphone 178 is provided within cabinet 102 (e.g., within top panel 118). It should be understood that a precise location of microphone 178 may vary according to specific embodiments.

Control panel 150 may include a speaker 168. Speaker 168 may be any suitable speaker or transducer capable of emitting audio signals. As described above, speaker 168 may be associated with smart software to provide information and assistance to users via audio prompts. Speaker 168 may also output various alerts and tones. For instance, speaker 168 may play tones to signal a cycle end time, a fault of the appliance, a timer conclusion or warning, or the like. Speaker 168 may be fully integrated with control panel 150. In some embodiments, speaker 168 is arranged within cabinet 102 (e.g., within top panel 118). It should be understood that a precise location of speaker 168 may vary according to specific embodiments.

Notably, conventional digital assistants or smart speakers require a standalone device including hardware necessary for receiving inputs, implementing the smart software, and providing the user with feedback. For example, smart speakers commonly include a microphone, an internet connected controller, and one or more visual identifiers (e.g., lights). However, as explained above, laundry appliance 100 (and other appliances) frequently include the same hardware. Accordingly, aspects of the present subject matter are directed to systems and methods for using or repurposing appliance hardware to implement smart software in a manner that would otherwise require external hardware. Thus, certain smart features (such as digital assistants) may be seamlessly implemented into home appliances without the need for additional hardware and/or software, or without a redesign of interfaces.

Figure 4:
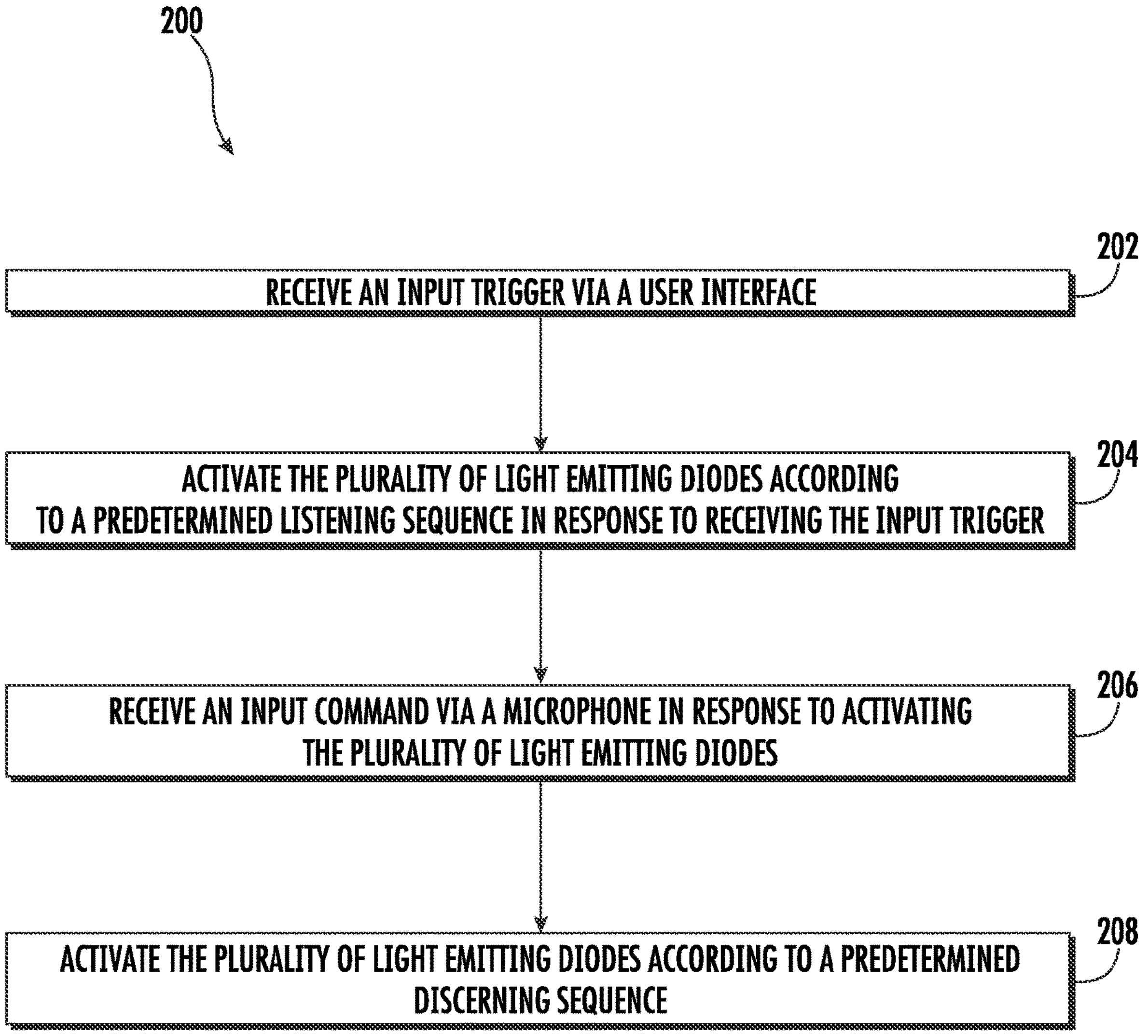
FIG. 4 provides a flow chart illustrating a method of operating an exemplary appliance.

Referring now to FIG. 4, a method 200 of operating an appliance (e.g., laundry appliance 100) will be described. It should be noted that method 200 may be applied to any suitable appliance and the disclosure is not limited to the laundry appliance described herein. Additionally or alternatively, the steps of method 200 may be performed in any order. Further, additional steps may be performed in addition to those described herein.

At step 202, method 200 may include receiving an input trigger via a user interface (e.g., control panel 150). In the presence of an appliance (e.g., laundry appliance 100), a user may require assistance or request information. The user may input a trigger to the appliance activate a microphone (e.g., microphone 178) to begin listening to a command. The input signal may be voice activated. For instance, the input trigger may be a wake command (e.g., "hey Alexa"). In alternate embodiments, the input trigger may be a physical activation. In detail, the input trigger may be a wake button provided on the user interface. A user may press the wake button to activate the microphone to begin listening for a command. In still other embodiments, the input trigger may be a physical gesture (e.g., a hand motion) in front of a camera or sensor provided on the appliance (e.g., within the user interface). Further, the input trigger may be a combination of one or more of the above described triggers.

At step 204, method 200 may include activating a plurality of light emitting diodes (LEDs) according to a predetermined listening sequence in response to receiving the input trigger. In detail, upon receiving the input trigger to activate the microphone, the user interface (e.g., via a controller such as controller 156) may activate a plurality of LEDs (e.g., the plurality of LEDs 160). The plurality of LEDs may be activated (or illuminated) according to a specific sequence or pattern. For instance, one or more sequences or patterns may be associated with one or more operations being performed, e.g., by smart software. The listening sequence may be described as a first predetermined sequence, and may be preprogrammed into the controller. The predetermined listening sequence may visually indicate to the user that the microphone is active and awaiting a command. Moreover, this predetermined listening sequence may correspond to the sequence that would be implemented by a separate smart speaker, e.g., by an Amazon® Echo or other smart speakers.

The predetermined listening sequence may follow a specific pattern. In detail, the controller may first activate a first LED from a first array (e.g., first array 162) of the plurality of LEDs. In some embodiments, the first LED of the first array is provided at or near a bottom of the first array. The controller may maintain the first LED of the first array in the activated or illuminated state. Simultaneously, the controller may activate or illuminate a first LED from a second array (e.g., second array 164) of the plurality of LEDs. In some embodiments, the first LED of the second array is provided at or near a bottom of the second array. The controller may maintain the first LED of the second array in the activated or illuminated state together with the first LED of the first array. Referring briefly to FIG. 3, the first LED of the first array may be first LED 180, and the first LED of the second array may be first LED 190.

Subsequently, the controller may activate or illuminate a second LED from the first array. In some embodiments, the second LED of the first array is provided adjacent to the first LED. For instance, the second LED may be arranged sequentially next to the first LED along a clockwise direction. The controller may still maintain the first LED of the first array in the activated or illuminated state and maintain the second LED of the first array in the activated or illuminated state. Simultaneously, the controller may activate or illuminate a second LED from the second array of the plurality of LEDs. In some embodiments, the second LED of the second array is provided adjacent to the first LED. For instance, the second LED may be arranged sequentially next to the first LED along a counter-clockwise direction. The controller may still maintain the first LED of the second array in the activated or illuminated state and maintain the second LED of the second array in the activated or illuminated state. Accordingly, the first and second LEDs of the first array and the first and second LEDs of the second array may be activated.

Subsequently, the controller may activate or illuminate a third LED from the first array. In some embodiments, the third LED of the first array is provided adjacent to the second LED. For instance, the third LED may be arranged sequentially next to the second LED along a clockwise direction. The controller may still maintain the first and second LEDs of the first array in the activated or illuminated state and maintain the third LED of the first array in the activated or illuminated state. Simultaneously, the controller may activate or illuminate a third LED from the second array of the plurality of LEDs. In some embodiments, the third LED of the second array is provided adjacent to the second LED. For instance, the third LED may be arranged sequentially next to the second LED along a counter-clockwise direction. The controller may still maintain the first and second LEDs of the second array in the activated or illuminated state and maintain the third LED of the second array in the activated or illuminated state. Accordingly, the first, second, and third LEDs of the first array and the first, second and third LEDs of the second array may be activated.

According to at least some embodiments, the controller may emit a first audio signal via a speaker (e.g., speaker 168) in conjunction with activating the plurality of LEDs according to the predetermined listening sequence. The first audio signal may be a tone signifying to the user that the microphone is active and listening. Thus, the first audio signal may be a listening signal.

At step 206, method 200 may include receiving an input command via the microphone in response to activating the plurality of light emitting diodes. After indicating to the user that the microphone is active and listening, the controller may determine that an input command has been received. The input command may be an audio input received by the microphone and processed or analyzed by the controller, or by a remote server. For instance, the input command may be a voice input or voice command from the user. The input command may include a request from the user to perform a task (e.g., obtain weather reports, set a calendar reminder, create a grocery list, etc.).

At step 208, method 200 may include activating the plurality of LEDs according to a predetermined recognition sequence (or predetermined discerning sequence) in response to receiving the input command. In detail, the predetermined recognition sequence may be referred to as a second predetermined sequence. Additionally or alternatively, the predetermined recognition sequence may be a thinking sequence, a searching sequence, a computing sequence, or the like. For instance, the predetermined recognition sequence may indicate to the user that the controller (or smart software) is performing the requested task or command. Similar to the predetermined listening sequence, the predetermined recognition sequence may correspond to the sequence that would be implemented by a separate smart speaker, e.g., by an Amazon® Echo or other smart speakers.

In detail, upon receiving the input command, the user interface (e.g., via the controller) may activate or illuminate the plurality of LEDs according to another specific sequence or pattern. The predetermined discerning sequence may follow a different specific pattern than the predetermined listening sequence. In detail, the controller may activate the plurality of LEDs in a sequential manner (e.g., along the circumferential direction). For instance, the controller may first activate a first LED from the first array of the plurality of LEDs. The controller may maintain the first LED of the first array in the activated or illuminated state. In at least some embodiments, the first LED of the first array may be positioned at or near a top of the first array.

Subsequently, the controller may activate or illuminate a second LED from the first array. In some embodiments, the second LED of the first array is provided adjacent to the first LED. For instance, the second LED may be arranged sequentially next to the first LED along a circumferential direction. The controller may still maintain the first LED of the first array in the activated or illuminated state and maintain the second LED of the first array in the activated or illuminated state. This activation pattern or sequence may continue until each LED in the first array is illuminated.

The controller may then activate or illuminate the second array in a sequential manner. For instance, the controller may first activate a first LED from the second array of the plurality of LEDs. The controller may maintain the first LED of the second array in the activated or illuminated state. In at least some embodiments, the first LED of the second array may be positioned at or near a bottom of the second array. In detail, the first LED of the second array may sequentially follow the last LED of the first array. According to one example, when the first LED of the first array is provided at or near the top of the first array and the sequential LEDs of the first array are activated from the top down, the first LED of the second array is positioned at or near the bottom of the second array and the sequential LEDs of the second array are activated from the bottom up. Thus, the plurality of LEDs follows a circular pattern about the input selector.

After each of the plurality of LEDs are activated, the controller may then deactivate the first LED from the first array of the plurality of LEDs. The controller may maintain the first LED of the first array in the deactivated state. Subsequently, the controller may deactivate the second LED from the first array. The controller may still maintain the first LED of the first array in the deactivated state and maintain the second LED of the first array in the deactivated state. This deactivation pattern or sequence may continue until each LED in the first array is deactivated.

The controller may then deactivate the second array in a sequential manner. For instance, the controller may first deactivate the first LED from the second array of the plurality of LEDs. The controller may maintain the first LED of the second array in the deactivated state. Similar to the example described above, when the first LED of the first array is provided at or near the top of the first array and the sequential LEDs of the first array are deactivated from the top down, the first LED of the second array is positioned at or near the bottom of the second array and the sequential LEDs of the second array are deactivated from the bottom up.

According to at least some embodiments, the controller may emit a second audio signal via the speaker at the initiation of activating the plurality of LEDs according to the predetermined discerning sequence. The second audio signal may be a tone signifying to the user that the smart software is performing a search, calculation, or instruction. Thus, the first audio signal may be a discerning signal. The second audio signal may be different from the first audio signal.

In some embodiments, the speaker outputs or emits a response to the input command. For example, when the input command is a request for information, the speaker relays that information via an audio output, which may be a computerized voice reciting an answer. The plurality of light emitting diodes may be activated according to a predetermined speaking sequence in conjunction with the output response. The predetermined speaking sequence may be a third predetermined sequence, which may be different from the predetermined listening sequence and the predetermined discerning sequence. Similar to the predetermined listening sequence and the predetermined recognition sequence, the predetermined speaking sequence may correspond to the sequence that would be implemented by a separate smart speaker, e.g., by an Amazon® Echo or other smart speakers.

In detail, at the outset of the predetermined speaking sequence, the controller may activate each of the plurality of LEDs. Thus, every LED may be activated. Subsequently, the controller may deactivate a first LED from the first array and a first LED from the second array. The first LED from the first array may be the same as or different from first LED 180, described above. For instance, the first LED may be positioned at or near the top of first array or at or near the bottom of first array. Similarly, the first LED from the second array may be the same as or different from first LED 190, described above. For instance, the first LED may be positioned at or near the top of second array or at or near the bottom of second array. Each of the first LED from the first array and the first LED from the second array may be maintained in the deactivated state.

Then, the controller may deactivate a second LED from the first array and a second LED from the second array. The second LED from the first array may be the same as or different from second LED 182, described above. For instance, the second LED may be provided adjacent to the first LED in the first array. Moreover, the second LED may be arranged sequentially next to the first LED along a circumferential direction. Similarly, the second LED from the second array may be the same as or different from second LED 192, described above. For instance, the second LED may be provided adjacent to the first LED in the second array. Moreover, the second LED may be arranged sequentially next to the first LED along a circumferential direction. Each of the first and second LEDs from the first array and the first and second LEDs from the second array may be maintained in the deactivated state.

Then, the controller may deactivate a third LED from the first array and a third LED from the second array. The third LED from the first array may be the same as or different from third LED 184, described above. For instance, the third LED may be provided adjacent to the second LED in the first array. Moreover, the third LED may be arranged sequentially next to the second LED along a circumferential direction. Similarly, the third LED from the second array may be the same as or different from third LED 194, described above. For instance, the third LED may be provided adjacent to the second LED in the second array. Moreover, the third LED may be arranged sequentially next to the second LED along a circumferential direction. Each of the first, second, and third LEDs from the first array and the first, second, and third LEDs from the second array may be maintained in the deactivated state.

This pattern may continue until each LED in both arrays are deactivated. At this point, the pattern may reverse, beginning with activating each of the last LED in the first array and the last LED in the second array. A reverse sequential approach may be taken when activating the LEDs.

According to the disclosure, a smart speaker system may be implemented into a home appliance. When utilizing the spart speaker or smart software technology, the factory installed light emitting diodes may be repurposed to perform or project visual alerts to a user as to an immediate state of the software. Advantageously, existing hardware within the home appliance may be repurposed without a requirement for additional hardware. For instance, light emitting diodes associated with operational indicators may be activated and deactivated according to predetermined illumination patterns depending on a state or action of the smart software.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laundry appliance, the laundry appliance comprising a cabinet, a user interface provided on the cabinet, a microphone within the user interface, and a plurality of light emitting diodes arranged in a predetermined pattern on the user interface, wherein each of the plurality of light emitting diodes is associated with an operational indicator of the laundry appliance, the method comprising:

receiving an input trigger via the user interface;

activating the plurality of light emitting diodes according to a predetermined listening sequence indicating the microphone is active and listening in response to receiving the input trigger;

receiving an input command via the microphone in response to activating the plurality of light emitting diodes; and activating the plurality of light emitting diodes according to a predetermined recognition sequence, the predetermined recognition sequence being different from the predetermined listening sequence.

2. The method of claim 1, wherein the laundry appliance further comprises a speaker, the method further comprising:

emitting a first audio signal via the speaker in conjunction with activating the plurality of light emitting diodes according to the predetermined listening sequence; and emitting a second audio signal via the speaker in conjunction with activating the plurality of light emitting diodes according to the predetermined recognition sequence.

3. The method of claim 2, wherein the input trigger is an audio input received by the microphone.

4. The method of claim 3, wherein the audio input is a voice input from a user received by the microphone.

5. The method of claim 2, further comprising:

determining that the input command is a request for information;

emitting a response to the request for information via the speaker in response to determining that the input command is the request for information; and activating the plurality of light emitting diodes according to a predetermined speaking sequence in conjunction with emitting the response, the predetermined speaking sequence being different from the predetermined listening sequence and the predetermined recognition sequence.

6. The method of claim 5, wherein the user interface comprises a rotatable control knob, and wherein the plurality of light emitting diodes are arranged circumferentially about the control knob.

7. The method of claim 6, wherein the plurality of light emitting diodes comprises a first array of light emitting diodes provided along a first portion of the control knob and a second array of light emitting diodes provided along a second portion of the control knob, each of the first and second arrays forming a semi-circular arc.

8. The method of claim 7, wherein the predetermined listening sequence comprises:

activating a first light emitting diode from the first array of light emitting diodes and a first light emitting diode from the second array of light emitting diodes simultaneously;

activating a second light emitting diode from the first array of light emitting diodes and a second light emitting diode form the second array of light emitting diodes simultaneously while maintaining the first light emitting diodes activated; and activating a third light emitting diode from the first array of light emitting diodes and a third light emitting diode from the second array of light emitting diodes simultaneously while maintaining the first and second light emitting diodes activated.

9. The method of claim 7, wherein the predetermined recognition sequence comprises:

activating the first array of light emitting diodes in a sequential manner, each light emitting diode among the first array of light emitting diodes being maintained in an activated state;

activating the second array of light emitting diodes in a sequential manner while maintaining the first array of light emitting diodes in the activated state, each light emitting diode among the second array of light emitting diodes being maintained in the activated state;

deactivating the first array of light emitting diodes in the sequential manner, each light emitting diode among the first array of light emitting diodes being maintained in a deactivated state; and deactivating the second array of light emitting diodes in the sequential manner while maintaining the first array of light emitting diodes in the deactivated state, each light emitting diode among the second array of light emitting diodes being maintained in the deactivated state.

10. The method of claim 7, wherein the predetermined speaking sequence comprises:

activating each of the plurality of light emitting diodes;

deactivating a first light emitting diode from the first array of light emitting diodes and a first light emitting diode from the second array of light emitting diodes simultaneously;

deactivating a second light emitting diode from the first array of light emitting diodes and a second light emitting diode from the second array of light emitting diodes simultaneously while maintaining the first light emitting diodes in a deactivated state; and deactivating a third light emitting diode from the first array of light emitting diodes and a third light emitting diode from the second array of light emitting diodes simultaneously while maintaining the first and second light emitting diodes in the deactivated state.

11. A laundry appliance, comprising:

a cabinet forming a receiving space;

a user interface provided on the cabinet, the user interface comprising a plurality of light emitting diodes, wherein each of the plurality of light emitting diodes is associated with an operational indicator of the laundry appliance;

a microphone provided within the user interface; and a controller operably connected with the microphone and the user interface, the controller being configured to perform a series of operations, the series of operations comprising:

receiving an input trigger;

activating the plurality of light emitting diodes according to a predetermined listening sequence indicating the microphone is active and listening in response to receiving the input trigger;

receiving an input command via the microphone in response to activating the plurality of light emitting diodes; and activating the plurality of light emitting diodes according to a predetermined recognition sequence, the predetermined recognition sequence being different from the predetermined listening sequence.

12. The laundry appliance of claim 11, further comprising a speaker, wherein the series of operations further comprises:

emitting a first audio signal via the speaker in conjunction with activating the plurality of light emitting diodes according to the predetermined listening sequence; and emitting a second audio signal via the speaker in conjunction with activating the plurality of light emitting diodes according to the predetermined recognition sequence.

13. The laundry appliance of claim 12, wherein the input trigger is a voice input received from a user received by the microphone.

14. The laundry appliance of claim 12, wherein the series of operations further comprises:

determining that the input command is a request for information;

emitting a response to the request for information via the speaker in response to determining that the input command is the request for information; and activating the plurality of light emitting diodes according to a predetermined speaking sequence in conjunction with emitting the response, the predetermined speaking sequence being different from the predetermined listening sequence and the predetermined recognition sequence.

15. The laundry appliance of claim 14, wherein the user interface comprises a rotatable control knob, and wherein the plurality of light emitting diodes are arranged circumferentially about the control knob.

16. The laundry appliance of claim 15, wherein the plurality of light emitting diodes comprises a first array of light emitting diodes provided along a first portion of the control knob and a second array of light emitting diodes provided along a second portion of the control knob, each of the first and second arrays forming a semi-circular arc.

17. The laundry appliance of claim 16, wherein the predetermined listening sequence comprises:

activating a first light emitting diode from the first array of light emitting diodes and a first light emitting diode from the second array of light emitting diodes simultaneously;

activating a second light emitting diode from the first array of light emitting diodes and a second light emitting diode form the second array of light emitting diodes simultaneously while maintaining the first light emitting diodes activated; and activating a third light emitting diode from the first array of light emitting diodes and a third light emitting diode form the second array of light emitting diodes simultaneously while maintaining the first and second light emitting diodes activated.

18. The laundry appliance of claim 16, wherein the predetermined recognition sequence comprises:

activating the first array of light emitting diodes in a sequential manner, each light emitting diode among the first array of light emitting diodes being maintained in an activated state;

activating the second array of light emitting diodes in a sequential manner while maintaining the first array of light emitting diodes in the activated state, each light emitting diode among the second array of light emitting diodes being maintained in the activated state;

deactivating the first array of light emitting diodes in the sequential manner, each light emitting diode among the first array of light emitting diodes being maintained in a deactivated state; and deactivating the second array of light emitting diodes in the sequential manner while maintaining the first array of light emitting diodes in the deactivated state, each light emitting diode among the second array of light emitting diodes being maintained in the deactivated state.

19. The laundry appliance of claim 16, wherein the predetermined speaking sequence comprises:

activating each of the plurality of light emitting diodes;

deactivating a first light emitting diode from the first array of light emitting diodes and a first light emitting diode from the second array of light emitting diodes simultaneously;

deactivating a second light emitting diode from the first array of light emitting diodes and a second light emitting diode from the second array of light emitting diodes simultaneously while maintaining the first light emitting diodes in a deactivated state; and deactivating a third light emitting diode from the first array of light emitting diodes and a third light emitting diode from the second array of light emitting diodes simultaneously while maintaining the first and second light emitting diodes in the deactivated state.

20. A method of operating an appliance, the appliance comprising a cabinet, a user interface provided on the cabinet, a microphone within the user interface, and a plurality of light emitting diodes arranged in a predetermined pattern on the user interface, wherein each of the plurality of light emitting diodes is associated with an operational indicator of the laundry appliance, the method comprising:

receiving an input trigger via the user interface;

activating the plurality of light emitting diodes according to a predetermined listening sequence indicating the microphone is active and listening in response to receiving the input trigger;

receiving an input command via the microphone in response to activating the plurality of light emitting diodes; and activating the plurality of light emitting diodes according to a predetermined recognition sequence, the predetermined recognition sequence being different from the predetermined listening sequence.

* * * * *